(No Model.) 2 Sheets—Sheet 1.

E. WESTON.
DYNAMO ELECTRIC MACHINE.

No. 340,395. Patented Apr. 20, 1886.

Attest:
Raymond F. Barnes
W. Frisby

Inventor:
Edward Weston
By Parker W. Page
atty.

(No Model.) 2 Sheets—Sheet 2.

E. WESTON.
DYNAMO ELECTRIC MACHINE.

No. 340,395. Patented Apr. 20, 1886.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

DYNAMO-ELECTRIC MACHINE.

SPECIFICATION forming part of Letters Patent No. 340,395, dated April 20, 1886.

Application filed December 27, 1884. Serial No. 151,311. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Dynamo-Electric Machines, of which the following is a specification, reference being had to the drawings accompanying and forming a part of the same.

Figure 1:
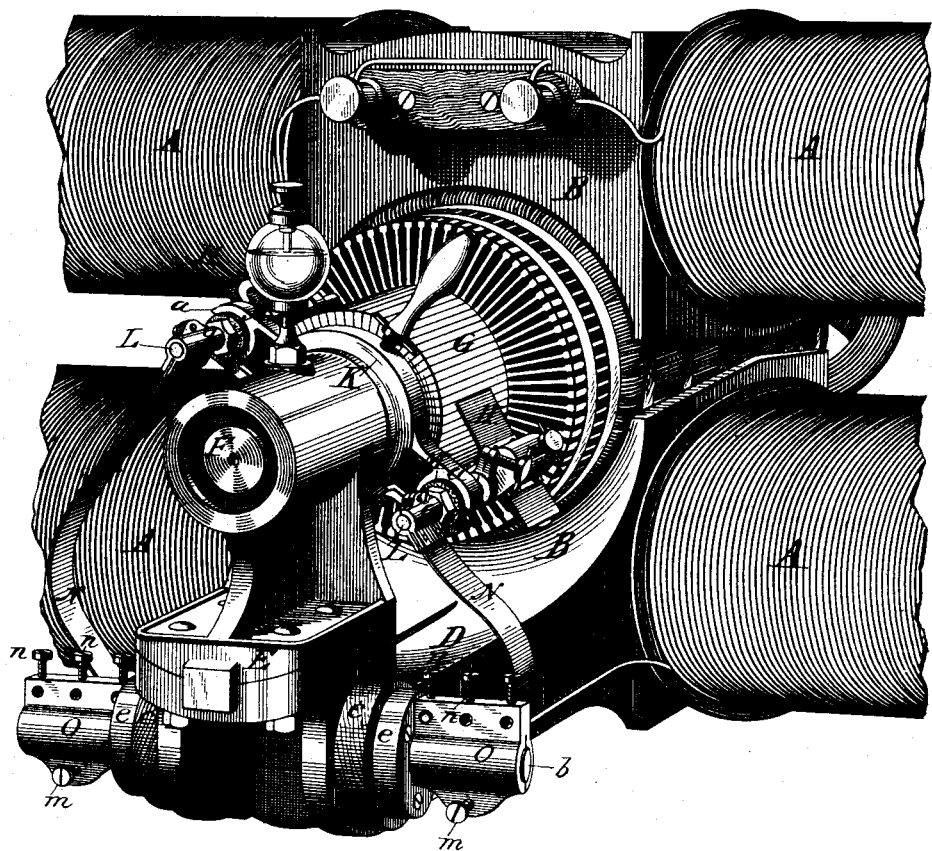
Figure 2:
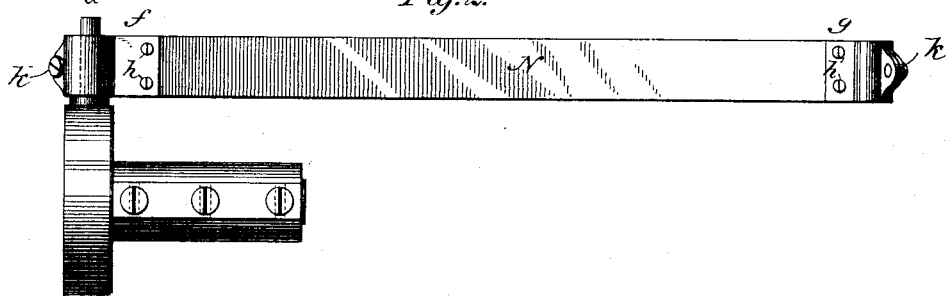
Figure 3:
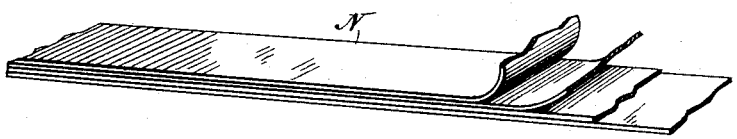

Figure 1 is a view in perspective of the portion of a dynamo or magneto electric machine to which the devices forming the subject of this application are applied. Fig. 2 is a plan view of the flexible connection which forms the subject of the invention. Fig. 3 is an enlarged detail view of a portion of one of the flexible connections.

A A are the field-magnets of a dynamo or magneto electric machine; B B, the pole-pieces, which are hollowed out and surround the armature C. From the lower pole-piece, B, extends an arm or projection, D, upon which is mounted the casting E, that forms the bearing for one end of the armature-shaft F. The commutator G is on this shaft between the bearing and the armature-core. The brushes H are carried by the projections $a$ from a plate and sleeve, K, mounted on the stationary bearing through which the shaft passes.

For the purpose of adjusting the position of the brushes on the commutator, this sleeve and plate is mounted so as to be capable of being turned about the shaft F. The brushes are supported by bars or rods L, that pass through and are secured to insulating-rings M, secured in the ears $a$.

As it is practically essential that the terminals of the machine should be stationary and easy of access, particularly so in the case of this machine, for the reason that the wire that surrounds the field-magnets forms a derived or shunt circuit and is taken off from the binding-posts, I secure to each side of the polar projection D a stud, $b$, between which and the pole-piece is an insulating plate or washer, $c$. The stud $b$ has a flat head, $e$, that is secured by screws to the washer $c$. From each head or plate extends a short stud, $d$, Fig. 2, and connection is made from these to the bars that support the brushes by the flexible conducting-strap N. This device consists of a number of flat and comparatively thin copper strips bound together at their ends by the copper or brass plates $f$ $g$ and screws $h$. These plates are formed to constitute clamps, which are tightened after they have been passed over the studs $d$ and the projecting ends of the rods L by screws K, passing through suitable ears.

Over the studs $b$ are slipped the castings O, of brass, which are split and provided with ears, through which pass screws $m$, by tightening which the castings are firmly secured to the studs. In the upper or solid parts of the castings O are two or more holes, into which enter binding-screws $n$. The flexible straps being applied to the machine and the castings O secured to the studs $b$, the ends of the field-coils are inserted into one of the holes in each casting O and the line-wires into the other or others, and the machine is in condition for work.

In the machines heretofore constructed by me, and upon which this device is an improvement, the connections between the brush-holders and the binding-posts were made by short cables composed of numerous strands of fine wire, the ends being bound together and soldered into a socket, forming part of a ring or perforated plate that was secured to the rod L and to the binding-post by nuts, the ends of rods L and portions of the binding-posts being screw-threaded for this purpose. In the constant jarring to which the machines when in use are subjected, these nuts became loosened, so that the electrical connections were impaired. The connections were more expensive and difficult to make, and the cables were less flexible than those which I have described herein. In my present form of connection the ends of the flexible straps are in the same vertical plane, so that in the adjustment of the sleeve K there is no twisting of the straps, which may therefore be made of superposed flat strips. There is no tendency in any of the parts to loosen, so that good contact is always maintained, and the castings O may be set at any angle at which it is desired to take off the line-wires.

While more particularly applicable to the special form of machine shown, the invention may obviously be applied to any form of machine in which connection is to be made between the adjustable brush-holders and stationary binding-posts.

What I claim is—

1. In a dynamo or magneto electric machine, the combination, with stationary terminals or binding-posts and adjustable brush-holders, of flexible conductors composed of flat copper strips united at their ends by metal plates, forming screw-clamps that are secured to studs in electrical connection with the binding-posts and the brushes, respectively, in the manner set forth.

2. The combination, with the stationary binding-posts of a dynamo-electric machine consisting of a plate, $e$, stud $b$, and casting O, formed as a clamp secured to the stud, of flexible straps composed of strips of copper bound together at their ends by plates, forming clamps secured, respectively, to the adjustable brush-holders and the binding-posts, as set forth.

3. The combination, with binding-posts secured to the pole-piece of a dynamo-machine and consisting of head or plate $e$, with studs $b$ and $d$ extending therefrom, and a clamp, O, provided with holes and screws for retaining the wires, of flexible conductors composed of copper strips bound together at their ends by plates, forming clamps connected to the studs $d$, and the rods L on the adjustable plate K, that carry the brushes, as set forth.

In testimony whereof I have hereunto set my hand this 20th day of December, 1884.

EDWARD WESTON.

Witnesses:
HENRY A. BECKMEYER,
DURAND WOODMAN.